United States Patent
Jahnke

(10) Patent No.: US 10,408,328 B1
(45) Date of Patent: Sep. 10, 2019

(54) EPICYCLIC WASHPIPE SWIVEL CARTRIDGE AND METHOD

(71) Applicant: PREMIUM OILFIELD TECHNOLOGIES, LLC, Houston, TX (US)

(72) Inventor: Douglas Jahnke, Houston, TX (US)

(73) Assignee: PREMIUM OILFIELD TECHNOLOGIES, LLC, Houston, TX (US)

(*) Notice: Subject to any disclaimer, the term of this patent is extended or adjusted under 35 U.S.C. 154(b) by 55 days.

(21) Appl. No.: 15/678,530

(22) Filed: Aug. 16, 2017

Related U.S. Application Data

(60) Provisional application No. 62/376,235, filed on Aug. 17, 2016.

(51) Int. Cl.
| | |
|---|---|
| *F16H 57/029* | (2012.01) |
| *F16H 1/28* | (2006.01) |
| *F16H 57/08* | (2006.01) |
| *F16H 57/04* | (2010.01) |
| *F16J 15/3204* | (2016.01) |
| *E21B 3/02* | (2006.01) |

(52) U.S. Cl.
CPC .......... *F16H 57/029* (2013.01); *F16H 1/28* (2013.01); *F16H 57/0486* (2013.01); *F16H 57/082* (2013.01); *E21B 3/02* (2013.01); *F16J 15/3204* (2013.01)

(58) Field of Classification Search
CPC ..... F16H 57/029; F16H 57/0486; F16H 57/08
See application file for complete search history.

(56) References Cited

U.S. PATENT DOCUMENTS

| | | | | |
|---|---|---|---|---|
| 2,998,735 | A * | 9/1961 | Elfes | B60K 17/046 180/372 |
| 5,107,718 | A * | 4/1992 | Inagawa | B60K 17/046 184/104.1 |
| 7,121,974 | B2 * | 10/2006 | Bayer | F16H 1/28 475/331 |
| 7,213,660 | B2 | 5/2007 | Martin | |
| 7,343,968 | B2 | 3/2008 | Kubala | |
| 7,789,161 | B2 | 9/2010 | Riley et al. | |
| 2004/0235609 | A1 * | 11/2004 | Chang | F16H 57/029 475/331 |
| 2008/0230274 | A1 | 9/2008 | Stubstad | |
| 2012/0270693 | A1 * | 10/2012 | Ando | C10M 133/06 475/160 |
| 2018/0273341 | A1 * | 9/2018 | Vitas | B65H 75/486 |

* cited by examiner

*Primary Examiner* — Stacey A Fluhart
(74) *Attorney, Agent, or Firm* — Jackson Walker, LLP

(57) ABSTRACT

The present invention provides an assembly, system, and method for an epicyclic washpipe swivel cartridge that can includes a gear reduction assembly with a sealed lubrication enclosure that can operate independent of roller bearings. The cartridge includes a pair of clamshell clamps to insert the cartridge in position without requiring dislocation of the mating assemblies. The system can further include a hydraulic port for efficient activation of the seals before placing high on a top drive of an oil derrick or other remote location.

15 Claims, 13 Drawing Sheets

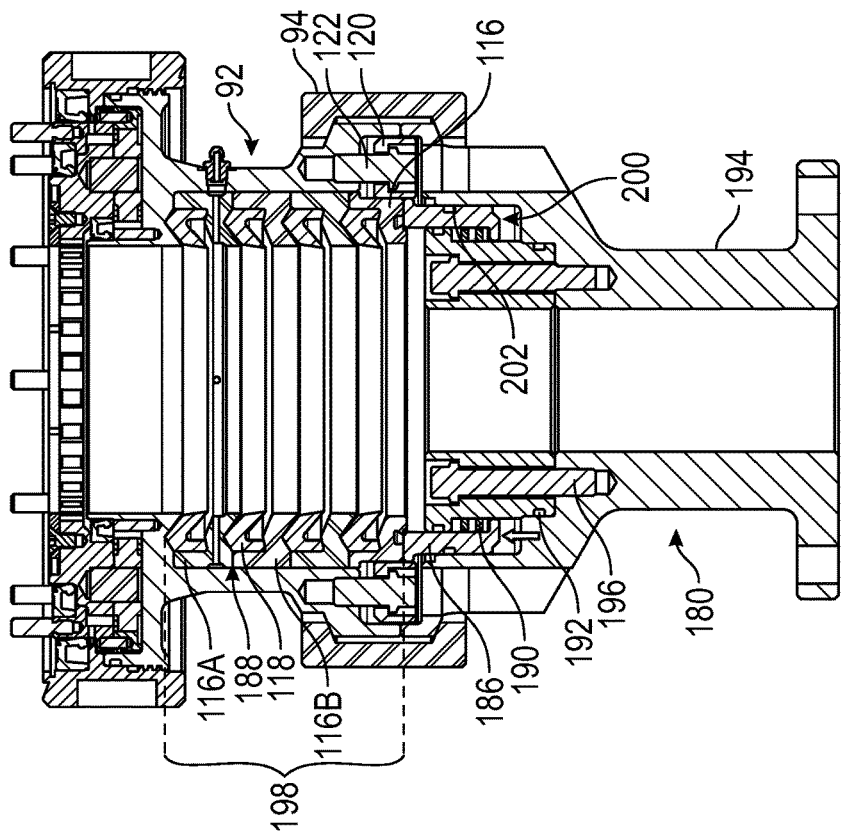
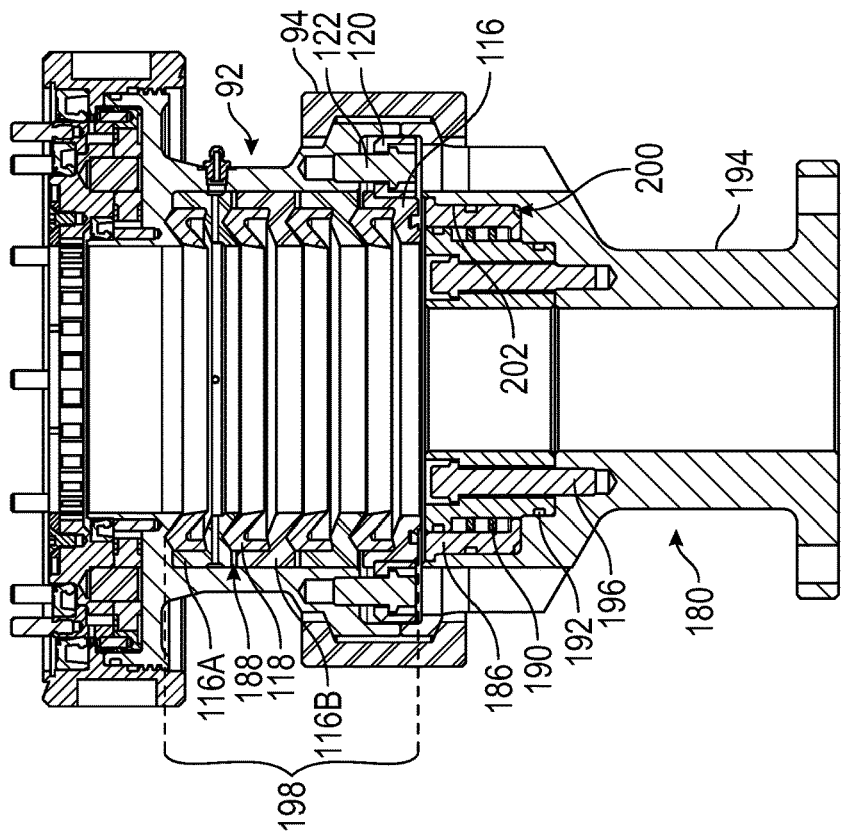

EPICYCLIC WASHPIPE SWIVEL CARTRIDGE AND METHOD

CROSS REFERENCE TO RELATED APPLICATIONS

This application claims the benefit of U.S. Provisional Application Ser. No. 62/376,235, filed Aug. 17, 2016, and is incorporated herein by reference.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The disclosure relates generally to equipment used to sealingly engage a rotating component with a nonrotating component. More specifically, the disclosure relates to a swivel cartridge having a non-rotational assembly and a first rotational assembly with a different rotational speed than a second rotational assembly with a sealed lubrication chamber for use in oil field applications including a rotating top drive.

Description of the Related Art

Some applications require a sealing engagement between rotating and nonrotating components. A nonlimiting application is for an oil field derrick and its use of a rotating top drive coupled to a non-rotating washpipe. The top drive rotates with the casing in the oil field well typically when drilling the well. The washpipe receives drilling fluid at high pressure and allows drilling fluid to flow downward under pressure into the top drive and into the drilling casing and the well. The seal between the top drive and the washpipe is generally known as a washpipe packing assembly. The sealing engagement of a traditional packing and seals in the washpipe packing assembly can rapidly deteriorate due to the wear between rotating and nonrotating components, causing leaks and safety and environmental concerns.

Some exemplary washpipe systems are listed below. These patents are incorporated herein by reference to the extent not contradictory to the drawings and descriptions of this application. One system in U.S. Pat. No. 7,213,660 entitled "Washpipe Seal", discloses in the Abstract:

The seal includes a first housing and a stack of radially inwardly extending, spaced apart annular stators, and a second seal housing and stack of spaced apart radially outwardly extending annular rotors interleaved with one another. The seal assembly, a cartridge, permits the first and second housings to rotate relative to each other in substantially fluid-tight relation except for the drilling fluid entering an outlet region at greatly reduced pressure. In a preferred embodiment, the seal is held by a sleeve that permits the cartridge to be removed and replaced while the fluid connections to the sleeve remains.

Another system disclosed in U.S. Pat. No. 7,343,968 entitled "Washpipe Seal Assembly", uses ceramic discs that are carefully honed to sealing engage each other at the traditional rotational speeds of a top drive and resist the associated wear. The patent discloses in the Abstract:

A coupling seal assembly is described for directing a pressurized abrasive fluid between a non-rotating conduit member and a rotating second conduit member. The seal assembly includes a first ceramic floating seal member secured to the non-rotating conduit member and a second ceramic seal member secured to the rotating conduit member.

Another system disclosed in U.S. Pat. No. 7,789,161 entitled "Apparatus For Interconnecting and Sealing Between Fixed and Rotating Conduits and Methods of Installing Same", discloses in the Abstract:

A seal assembly, for sealing between a stationary conduit and a rotating conduit, comprises an upper gland assembly, a washpipe, and a lower gland assembly. The upper gland assembly is operable to engage the stationary conduit. A washpipe partially disposed within the upper gland assembly. An upper seal member is disposed within the upper gland assembly around a periphery of the washpipe. An upper packing ring is engaged with the upper gland assembly so as to compress the upper seal member into sealing engagement with the washpipe. A lower gland assembly is disposed about the washpipe and operable to engage the rotating conduit. A lower seal member is disposed within the lower gland assembly and is compressed into sealing engagement with the washpipe by a lower packing ring that is engaged with the lower gland assembly. The engagement of the packing rings with their respective gland assemblies is independent of the engagement of the gland assemblies and the conduits.

Another system, disclosed in US Publ. No. 2008/0230274 A1 ("the '274 Publication") entitled "Top Drive Washpipe System" uses a gear reduction system coupled between the top drive and the washpipe that reduces the relative rotational speed between the top drive and the washpipe. The top drive relative speed to the reduction system is one-half of the total speed difference between the top drive and the washpipe. The reduction system relative speed to the non-rotational washpipe is the other one-half of the total speed reduction. The system therefore divides the relative speeds between the components to increase the seal life. The "274 Publication states in paragraph 0008:

The present invention, in certain aspects, provides a shaft sealing assembly in which an auxiliary shaft rotated by a rotating main shaft is connected to and rotates with the shaft via a speed reducer, e.g., a gear drive apparatus, between the main shaft and the auxiliary shaft so that the auxiliary shaft rotates at a reduced speed compared to the speed of the main shaft, e.g. about one-half the main shaft speed, thus exposing seals dynamically sealing against the auxiliary shaft to a surface which is moving at the reduced speed, thus enhancing seal life.

FIG. 1 of the present application is a schematic cross sectional view of FIG. 3 of the '274 Publication as an exemplary known top drive washpipe system. As the '274 Publication explains in paragraphs 0031 through 0034:

A washpipe shaft 70 projects into an upper packing assembly 16 and rotates with the main shaft M (but is connected to the main shaft only via a gear system described below). Upper and lower packing assemblies 16 and 18 respectively, have seals which seal against the washpipe shaft 70.

Drilling mud flows through a channel 22 of the gooseneck 24 into an interior 70a of the washpipe shaft 70 and from there down a channel C through the main shaft M into the drill pipe.

Packing 15 of the upper packing assembly 16 does not rotate with the washpipe shaft 70. The outer surface of the washpipe shaft 70 rotates against the packing 15 . . . .

A primary gear 40 is secured to and rotates with the main shaft within the housing 34. Teeth 40a on the primary gear 40 mesh with teeth 42a on planetary gears 42 that are mounted on shafts 44 of a gear carrier 46. Ball bearings 48 in a lower part 52 of the housing 34 and ball bearings 49 under an upper part 54 of the housing 34 isolate the housing 34 from the rotation of the main shaft M, rotation of the primary gear 40, and rotation of the planetary gears 42.

The ball bearings appear to support the radial and thrust loads with appropriate clearances between adjacent metal surfaces. However, the commercial embodiment of the '274 Publication is relatively expensive with the ball bearings and other components. It is also larger in diameter with the ball bearings than can be accommodated with some installations. Further, the gear reduction system is exposed to the elements and not lubricated.

There remains a need to increase seal life between rotational/non-rotational systems, such as in top drive washpipe applications described above, but in a more efficient and less expensive system.

SUMMARY OF THE INVENTION

The present invention provides an assembly, system, and method for an epicyclic washpipe swivel cartridge that can includes a gear reduction assembly with a sealed lubrication enclosure that can operate independent of roller bearings. The cartridge includes a pair of clamshell clamps to insert the cartridge in position without requiring dislocation of the mating assemblies. The system can further include a hydraulic port for efficient activation of the seals before placing high on a top drive of an oil derrick or other remote location.

The present invention discloses an epicylic washpipe swivel cartridge for a washpipe, comprising: a lower assembly, a planet gear carrier assembly, a ring gear assembly, and a retainer ring assembly. The lower assembly has a bore and a circumferential channel around an inside perimeter of the lower assembly bore, the channel having an upper face open in an upward direction, and a sun gear coupled to a radially inward periphery of the circular channel, the sun gear configured to radially engage outwardly. The planet gear carrier assembly has a carrier ring, a downwardly disposed axle, a planet gear rotatably coupled to the axle and supported by the upper face of the channel, the sun gear disposed radially outward from the sun gear and configured to engage the sun gear, and a rotary seal disposed between the carrier ring and the lower assembly that is configured to seal a leakage path through an interface between the lower assembly and the carrier ring from the washpipe radially outward. The ring gear assembly having a ring gear disposed radially outward from the planet gear, the ring gear configured to rotatably engage the planet gear distally from the sun gear, a holding ring coupled to the ring gear, and a rotary seal disposed between the holding ring and the carrier ring that is configured to seal a leakage path from an upward direction into an interface between the holding ring and the carrier ring. The retainer ring assembly configured to radially engage an outward surface of the lower assembly adjacent the ring gear assembly, the retainer ring assembly having a retainer ring and a rotary seal disposed radially inward from the retainer ring that is configured to seal a leakage path from an upward direction into an interface between the retainer ring and the holding ring. An upper assembly can be generally included having a bore, and a packing spacer and a packing seal disposed around the bore, where the upper assembly is generally coupled to the ring gear assembly and is non-rotational relative to an upper top drive connection.

The present invention also discloses a seal compressor for an annular packing stack of packing spacers and packing seals, comprising: a compressor assembly housing comprising: a piston chamber; a piston disposed in the piston chamber and sized to engage the annular packing stack; a bias element to bias the piston to a closed position; and a fluid port fluidicly coupled to the piston chamber.

BRIEF DESCRIPTION OF THE SEVERAL VIEWS OF THE DRAWINGS

FIG. 8C is a schematic cross sectional view of the seal compressor coupled with the swivel cartridge of FIG. 8B showing a gap between a seal and a spacer.

FIG. 8D is a schematic cross sectional view of the seal compressor coupled with the swivel cartridge of FIG. 8C showing the seal compressor activated to close the gap between the seal and spacer.

DETAILED DESCRIPTION

Figure 1:
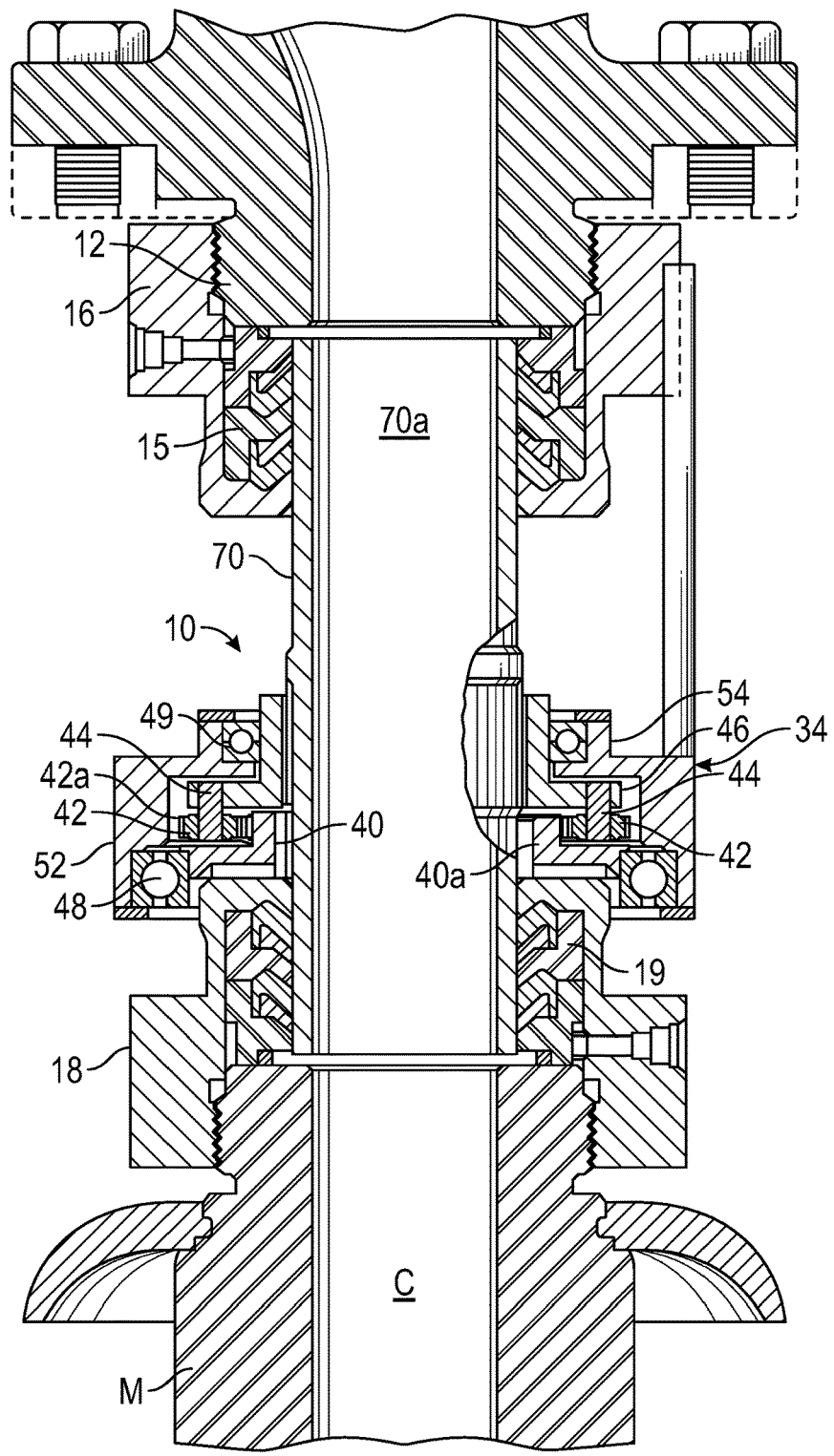
FIG. 1 is schematic cross sectional view of a known top drive washpipe system.

The Figures described above and the written description of specific structures and functions below are not presented to limit the scope of what Applicant has invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present disclosure will require numerous implementation-specific decisions to achieve the developer's ultimate goal for the commercial embodiment. Such implementation-specific decisions may include, and likely are not limited to, compliance with system-related, business-related, government-related, and other constraints, which may vary by specific implementation or location, or with time. While a developer's efforts might be complex and time-consuming in an absolute sense, such efforts would be, nevertheless, a routine undertaking for those of ordinary skill in this art having benefit of this disclosure. It must be understood that the inventions disclosed and taught herein are susceptible to numerous and various modifications and alternative forms. The use of a singular term, such as, but not limited to, "a," is not intended as limiting of the number of items. Further, the various methods and embodiments of the system can be included in combination with each other to produce variations of the disclosed methods and embodiments. Discussion of singular elements can include plural elements and vice-versa. References to at least one item may include one or more items. Also, various aspects of the embodiments could be used in conjunction with each other to accomplish the understood goals of the disclosure. Unless the context requires otherwise, the term "comprise" or variations such as "comprises" or "comprising," should be understood to imply the inclusion of at least the stated element or step or group of elements or steps or equivalents thereof, and not the exclusion of a greater numerical quantity or any other element or step or group of elements or steps or equivalents thereof. The device or system may be used in a number of directions and orientations. The terms "top", "up', "upward', "bottom", "down", "downwardly", and like directional terms are used to indicate the direction relative to the figures and their illustrated orientation and are not absolute in commercial use but can vary as the assembly varies its orientation. The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions. Some elements are nominated by a device name for simplicity and would be understood to include a system of related components that are known to those with ordinary skill in the art and may not be specifically described.

The present invention provides an assembly, system, and method for an epicyclic washpipe swivel cartridge that can includes a gear reduction assembly with a sealed lubrication enclosure that can operate independent of roller bearings. The cartridge includes a pair of clamshell clamps to insert the cartridge in position without requiring dislocation of the mating assemblies. The system can further include a hydraulic port for efficient activation of the seals before placing high on a top drive of an oil derrick or other remote location.

Figure 2:
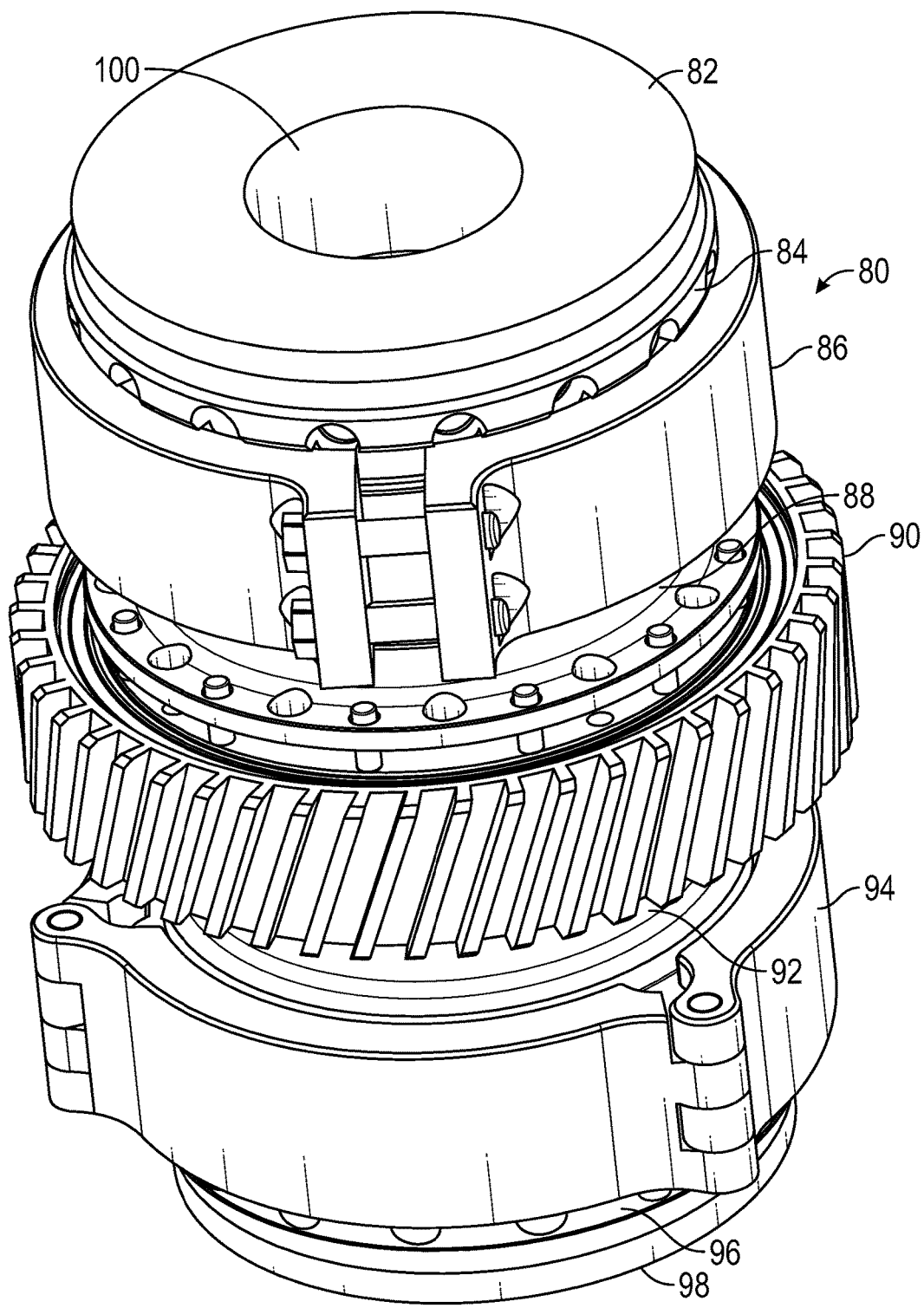
FIG. 2 is a schematic perspective view of an exemplary embodiment of an epicyclic washpipe swivel cartridge of the present invention.

FIG. 2 is a schematic perspective view of an exemplary embodiment of an epicyclic washpipe swivel cartridge of the present invention. The epicyclic washpipe swivel cartridge 80 is designed to slide in place and quickly connect between components of the top drive assembly. The cartridge 80 is designed to reduce the relative speed between the upper non-rotatable portion of the top drive and the lower rotatable portion of the top drive through gearing disclosed herein to reduce the relative wear on the packing seals. Importantly, the cartridge is designed to be used without the expense and size of ball bearings and their respective races and assemblies. Rather, the cartridge is designed to operate without the bearings through a sealed lubrication chamber to reduce wear that would otherwise occur from the metal-to-metal contact among the various components.

In general, the cartridge 80 includes an upper assembly 88 coupled to a lower assembly 92 with a retainer ring assembly 90 and various gearing components coupled between the upper and lower assemblies, as explained herein. Various assemblies rotate around a longitudinal axis 176. Flow through the top drive assembly and the cartridge can occur through the bore 100. To aid in a quick connect/disconnect with the top drive assembly, a pair of adapter hubs can be coupled to the customary top drive upper and lower connections and the cartridge held in position with the adapter hubs by a pair of clamps. For example, an upper top drive connection 82 that is non-rotatable could represent the gooseneck or other fixed components of the top drive assembly or be coupled to such components. An upper adapter hub 84 can be threadably coupled with the upper top drive connection 82. An upper clamp 86 that radially surrounds a portion of both of the perimeters of the adapter hub 84 and the upper assembly 88 can releasably couple the components together. Similarly, a lower top drive connection 98 which is rotatable about the longitudinal axis 176 could represent the main shaft or be coupled to the main shaft and be threadably coupled to a lower adapter hub 96. The lower adapter hub 96 can be releasably coupled with the lower assembly 92 through a lower clamp 94. To change the cartridge 80, the clamps 86 and 94 can be unfastened to release the cartridge, and the cartridge slid out from between the lower and upper adapter hubs 84 and 96. The gear components reduce the relative rotational speed of the lower assembly 92 to the washpipe 102 compared to the relative rational speed of the lower assembly to the upper assembly 88, and thus the relative rotational speed of the washpipe to the upper assembly. The relative portions of the differential speeds between the washpipe to the lower assembly and the washpipe to the upper assembly can be varied according to a designer's preference and parameters. In general and without limitation, an example could be the relative rotational speed of one assembly could be a one-quarter portion of the total rotational speed differential between the lower assembly and the upper assembly and the remaining three-quarters portion to the other assembly. Another nonlimiting example could be the relative rotational speed of one assembly could be a one-half portion of the total rotational speed differential between the lower assembly and the upper assembly and the remaining one-half portion to the other assembly.

Figure 3:
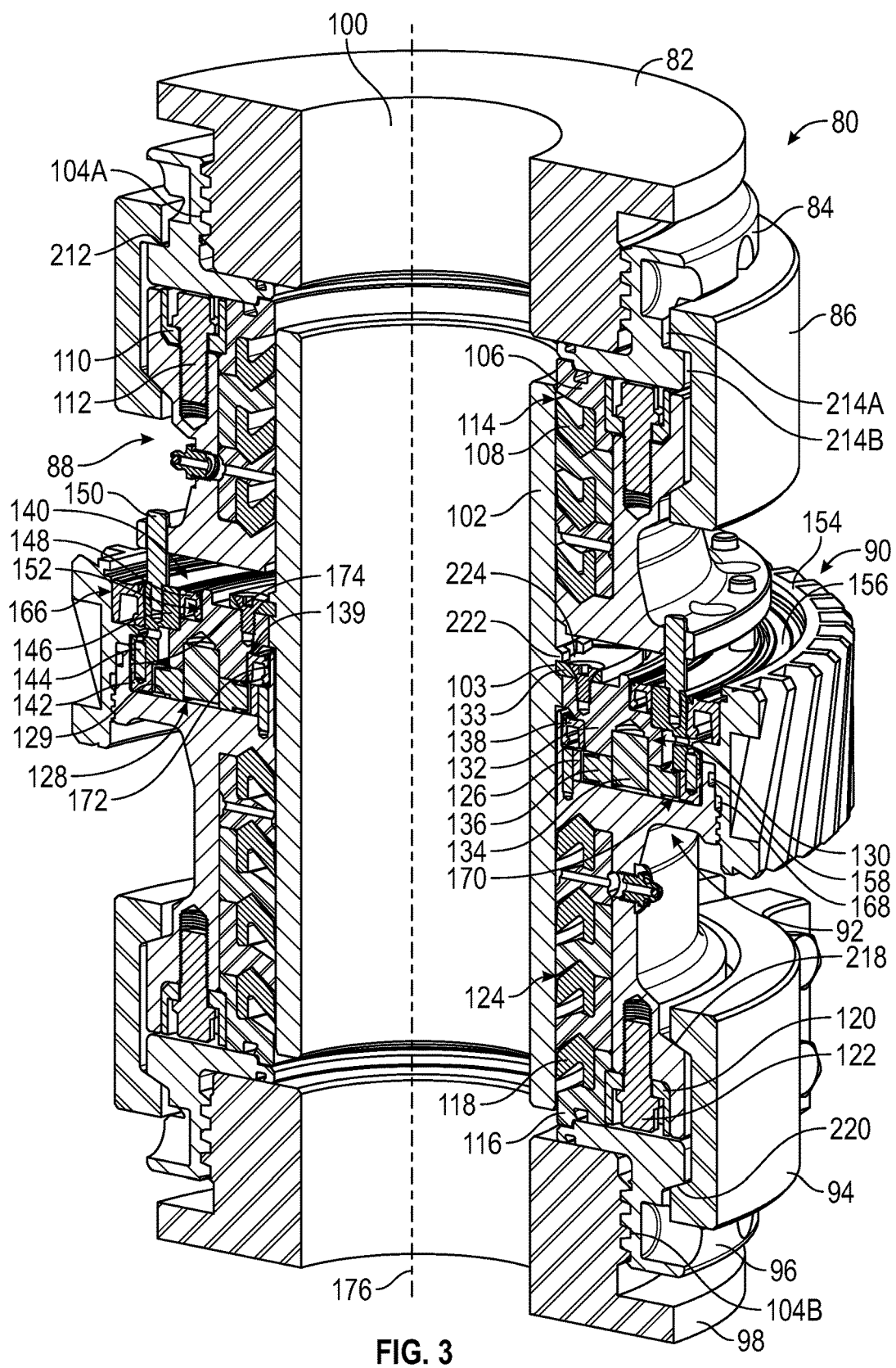
FIG. 3 is a schematic cross sectional perspective view of the epicyclic washpipe swivel cartridge of FIG. 2.

FIG. 3 is a schematic cross sectional perspective view of the epicyclic washpipe swivel cartridge of FIG. 2. The upper top drive connection 82 can be threadably coupled with the upper adapter hub 84 with mating threads 104A. The upper adapter hub 84 can be coupled with the upper assembly 88 through a peripheral upper clamp 86. The upper assembly 88 can include a tapered peripheral shoulder 210 with a corresponding tapered shoulder on a lower portion of the upper clamp 86 to clamp around the upper assembly. The upper adapter hub 84 can include a sliding shoulder 212 with a corresponding sliding shoulder on an upper portion of the upper clamp 86 to clamp around the upper adapter hub. The peripheral size of the sliding shoulder 212 compared to the peripheral size of the corresponding upper adapter hub can allow radially gaps 214A and 214B for the adapter hub to slide laterally for misalignment accommodation. The tapered shoulder 210 in conjunction with the sliding shoulder 212 can be used to longitudinally pull the upper assembly 88 closely together to the upper adapter hub 84 as the clamp is tightened radially around the upper assembly and upper adapter hub to sealingly engage therebetween. The sliding shoulder also allows the upper assembly to be coupled with the upper adapter hub with some misalignment. A misalignment could be caused by tolerances or assembly between the upper top drive connection 82 and lower top drive connection 98, when the upper assembly 88 is aligned with the lower assembly 92.

The upper assembly 88 can include at least one and in general a plurality of upper packing spacers 106 with upper packing seals 108 disposed therebetween to form an upper packing stack. An upper packing retainer ring 110 that overlaps radially inwardly on the upper packing spacers 106 to hold down the packing spacers and packing seals with the use of a plurality of fasteners 112 disposed circumferentially around the upper assembly 88. The inside circumference of the upper packing seals 108 can sealingly engage an outer wall of the internal washpipe 102 at an upper washpipe-to-packing seal interface 114.

Similarly, a lower top drive connection 98 which is rotatable can be threadably coupled with the lower adapter hub 96 with mating threads 104B. The lower adapter hub 96 can be coupled with the lower assembly 92 through a peripheral lower clamp 94. The lower assembly 92 can include a tapered peripheral shoulder 218, and the upper portion of the lower clamp 94 can include a corresponding tapered peripheral shoulder to clamp around the lower assembly. Similarly, the adapter hub 96 can include a tapered peripheral shoulder 220, and the lower portion of the lower clamp 94 can include a corresponding tapered peripheral shoulder to clamp around the lower adapter hub. The tapered shoulders 218 and 220 allow the clamp 94 to be tightened and progressively close a gap between the adapter hub 96 and lower assembly 92 into sealing engagement. Further, the clamp 94 with the tapered shoulders helps radially align the lower adapter hub 96 with the lower assembly 92. As the lower top drive connection 98 rotates, the lower adapter hub 96, the lower assembly 92, the upper assembly 88, and the gearing between the lower and upper assemblies can rotate in substantial radial alignment with the lower top drive connection 98 and assemblies connected thereto. On the other end adjacent the upper adapter hub 84, the sliding shoulder 212 can allow for an amount of misalignment between the aligned components listed above and the upper top drive connection 82 that is connected with the upper adapter hub 84.

The lower assembly 92 further includes at least one and in general a plurality of lower packings spacers 116 with lower packing seals 118 disposed therebetween to form a lower packing stack. A lower packing retainer ring 120 can overlap radially inward on the lower packing spacers 116 to hold the packing spacers and packing seals in position with the use of a plurality of fasteners 122 disposed circumferentially around the lower assembly 92. The inside circumference of the lower packing seals 118 can sealingly engage an outer wall of the washpipe 102 at a lower washpipe-to-packing seal interface 124.

Between the upper assembly 88 and the lower assembly 92 is an assembly of various gearing components described herein. Several components are assembled in a channel 128 formed in an upward portion of the lower assembly 92. A bottom of the channel 128 forms an upper face 129 that is oriented upward. Two circumferential side walls generally form the inner side wall 172 and outer side wall 174 of the channel. A sun gear 126 is coupled to the lower assembly 92 toward the inner wall 172 of the channel 128 with gear teeth of the sun gear facing radially outward.

Figure 7:
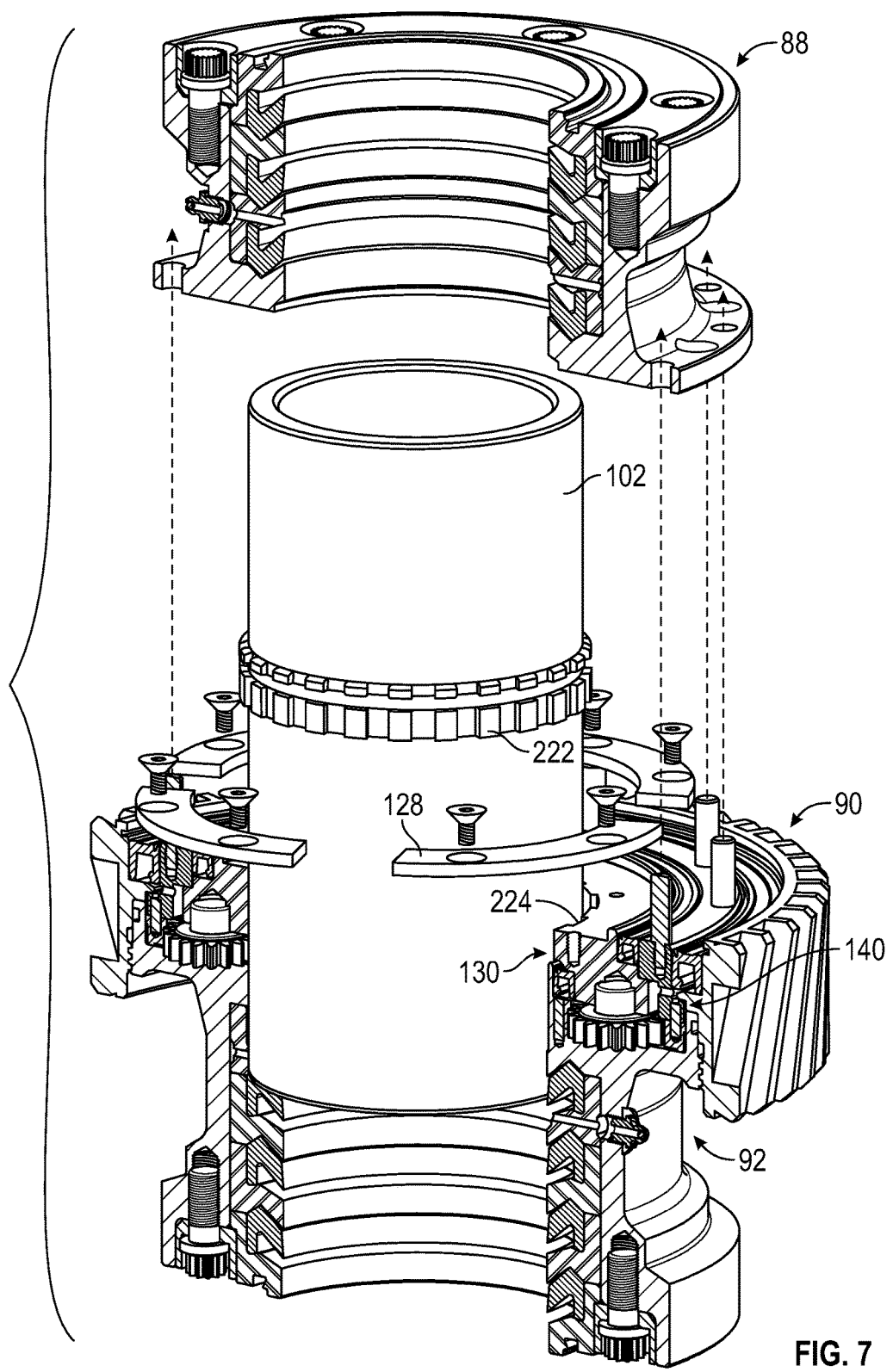
FIG. 7 is a schematic perspective view of portions of the epicyclic washpipe swivel cartridge disassembled for maintenance.

A planet gear carrier assembly 130 can be mounted at least partially radially outward from the sun gear 126 and can include a carrier ring 132. The carrier ring 132 can support an axle 134, such as a pin or dowel, that faces downward toward the channel upper face 129. At least one planet gear 136 is rotatably coupled around the axle 134 and disposed between an underneath surface of the carrier ring and the upper face 129 of the channel 128. The planet gear 136 is formed with radially outward gear teeth and can engage the corresponding gear teeth in the sun gear 126 disposed radially outward from the planet gear. A circular retainer plate 133 can be coupled to the carrier ring 132 and sized to fit inside a radial groove 103 on an outside surface of the washpipe 102. The groove 103 can maintain the relative longitudinal position of the washpipe in the swivel cartridge 80 and specifically relative to the planet gear carrier assembly 130. A rotary seal 138 can be disposed between the lower assembly 92 at the sun gear 126 and the carrier ring 132 to seal an interface 139 between the lower assembly and the carrier ring that otherwise would be a leakage path. The planet gear carrier assembly 130 rotates at less speed relative to the washpipe than the lower assembly 92 due to the gearing between the sun gear 126 and the planet gear 136. The rotary seal 138 can seal the interface 139 between the lower assembly and the carrier ring with the differential speed of rotation. The washpipe 102 can be rotationally coupled with the carrier ring 132 by radially extending splines 222 on a radial outside surface of the washpipe 102 rotationally that rotationally interlock between radially extending splines 224 on a radially inside surface of the carrier ring 132. The carrier ring splines are also shown in FIG. 5B, and the washpipe splines are also shown in FIG. 7.

A ring gear assembly 140 is disposed at least partially radially outward from the planet gear carrier assembly 130 in the channel 128 on the upper face 129 of the lower assembly 92. The ring gear assembly 140 includes a ring gear 142 has radially inwardly disposed gear teeth to rotationally engage corresponding gear teeth on the planet gear 136. The ring gear 142 is coupled with pin 144 to a holding ring 146. The holding ring 146 in turn is coupled with a pin 150 to the upper assembly 88. Because the upper assembly is rotationally fixed, then the holding ring 146 and ring gear 142, being coupled to the upper assembly, also do not rotate. Thus, the ring gear 142 slides in the channel 128 as the lower assembly rotates about the longitudinal axis 176. Because the plane gear carrier assembly rotates and the ring read assembly does not rotate, then a rotary seal 148 can be disposed at an interface 152 between the holding ring 146 and the carrier ring 132 to accommodate the differential speed of rotation about the longitudinal axis 176 and seal the leakage path that otherwise would exist.

The retainer ring assembly 90 referenced above can include a retainer ring 154. The retainer ring can be threadably coupled with the lower assembly 92 radially outwardly from the channel 128. A stationary seal 158 can seal the coupling between the retainer ring 154 and the lower assembly 92, because the two components do not have a differential speed of rotation. A secondary seal 168 can also seal the coupling between these two components. Because the retainer ring 154 is coupled to the lower assembly 92 with the same rotational speed compared to the holding ring 146 that is coupled to the upper assembly 88 that does not rotate, a rotary seal 156 can be disposed at an interface 166 between the retainer ring and the holding ring to accommodate the differential speed of rotation about the longitudinal axis and seal the leakage path that otherwise would exist.

The absence of ball bearings typically would cause metal-to-metal wear and galling, particle shearing, and eventual seizing, lock up, and failure of the rotational components. Hence, prior efforts taught the need for the bearings, such as ball bearings, that would typically carry the axial and radial loads as discussed in the Background section above. However, the present invention diverts from the conventional teaching for a washpipe assembly. The present invention creates a sealed lubrication chamber 170 with the channel 128 and the various rotary and stationary seals at the interfaces and coupling surfaces discussed above. The lubrication chamber 170 substantially encompasses the gear teeth and metal wearing surfaces between the lower assembly channel, sun gear, planet gear carrier assembly, and ring gear assembly.

Figure 4:
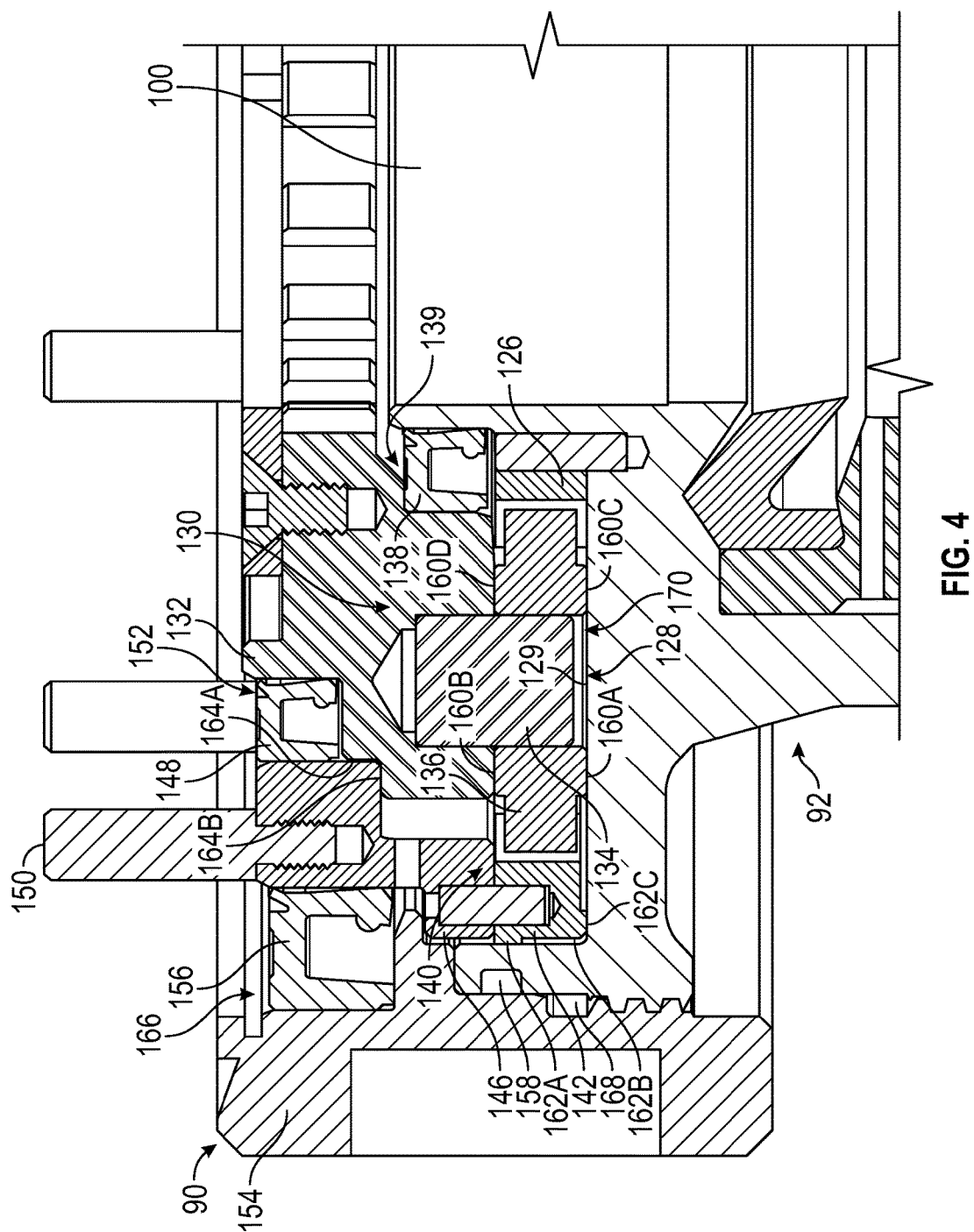
FIG. 4 is a schematic partial cross sectional view of a channel in the lower assembly and retainer ring with the planet gear carrier assembly coupled with a ring gear assembly in the channel.

FIG. 4 is a schematic partial cross sectional view of a channel in the lower assembly and retainer ring with the planet gear carrier assembly coupled with a ring gear assembly in the channel. The components have been described above. In general, the sun gear 126 is coupled to the lower assembly 92 in a radially inward periphery of the channel 128. The planet gear 136 of the planet gear carrier assembly 130 is rotationally coupled to the carrier ring 132 about the longitudinal axis 176 and has gear teeth that are rotationally engaged with corresponding gear teeth on the sun gear. Due to the gearing, the carrier ring rotates at a different speed around the longitudinal axis than the lower assembly 92. The ring gear 142 of the ring gear assembly 130 is disposed on a distal side of the channel 128 from the sun gear 126 and is coupled to the holding ring 146. The holding ring 146 is coupled to the non-rotatable upper assembly 88 shown in FIG. 3, and so the holding ring and the ring gear do not rotate around the longitudinal axis 176. The retainer ring 154 is coupled with the lower assembly. Due to the differential rotational speeds between the lower assembly 92 and the planet gear carrier assembly 130, between the planet gear carrier assembly 130 and the ring gear assembly 140, and between the ring gear assembly 140 and the retainer ring assembly, the rotary seals 138, 148, and 156 respectively are inserted in the respective interfaces 139, 152, and 166 therebetween. One or more of the stationary seal 158 and stationary seal 168, if desired, can seal the non-rotational coupling between the retainer ring 154 and the lower assembly 92. The various seals, particularly the rotary seals with the channel, form the sealed lubrication chamber 170 that encompasses the gear teeth and metal wearing surfaces discussed above. The lubrication placed into the sealed lubrication chamber can liquid such as oil, viscous such as grease, or solid such as graphite. Importantly, the sealed lubrication chamber also restricts contaminants from entering the chamber. Oil field mud, shavings, and sediments can cause significant damage and failure to such components. The sealed lubrication chamber thus can retain lubrication within the chamber and restrict contaminants from entering the chamber. The sealed lubrication chamber can help avoid the wear and galling at such metal-to-metal surfaces as the planetary gear wear surfaces 160A, 160B, 160C, and 160D. The sealed lubrication chamber can also help avoid the wear and galling at such metal-to-metal surfaces as the ring gear wear surfaces 162A, 162B, and 162C. The sealed lubrication chamber can further help avoid the wear and galling at such metal-to-metal surfaces as the carrier ring wear surfaces 164A and 164B. The sealed lubrication chamber with lubrication is used to avoid the otherwise needed bearings, such as the ball bearings of prior efforts.

Figure 5A:
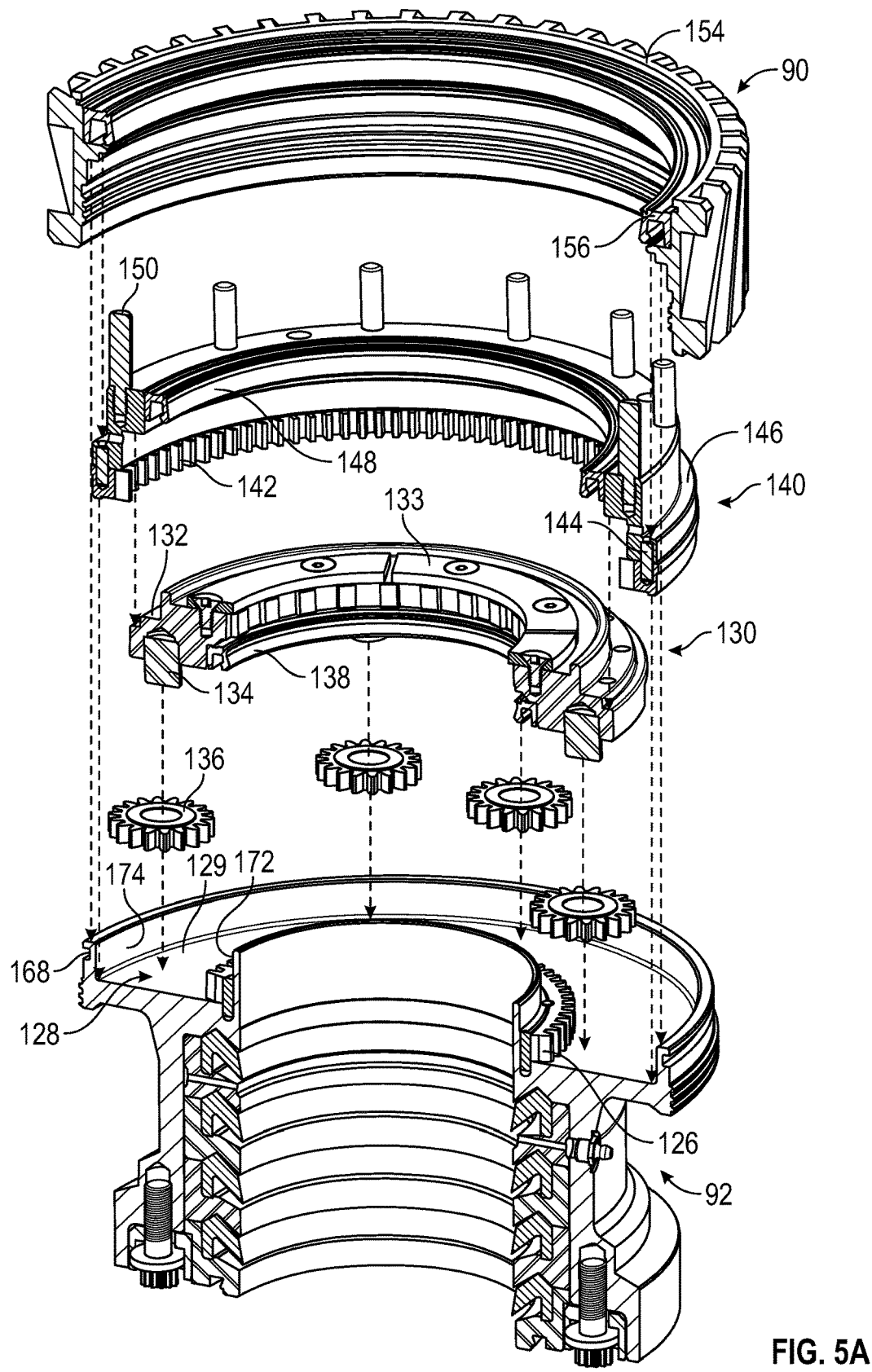
FIG. 5A is a schematic assembly view of an exemplary planet gear carrier assembly and lower assembly of the epicyclic washpipe swivel cartridge of FIG. 3.
Figure 5B:
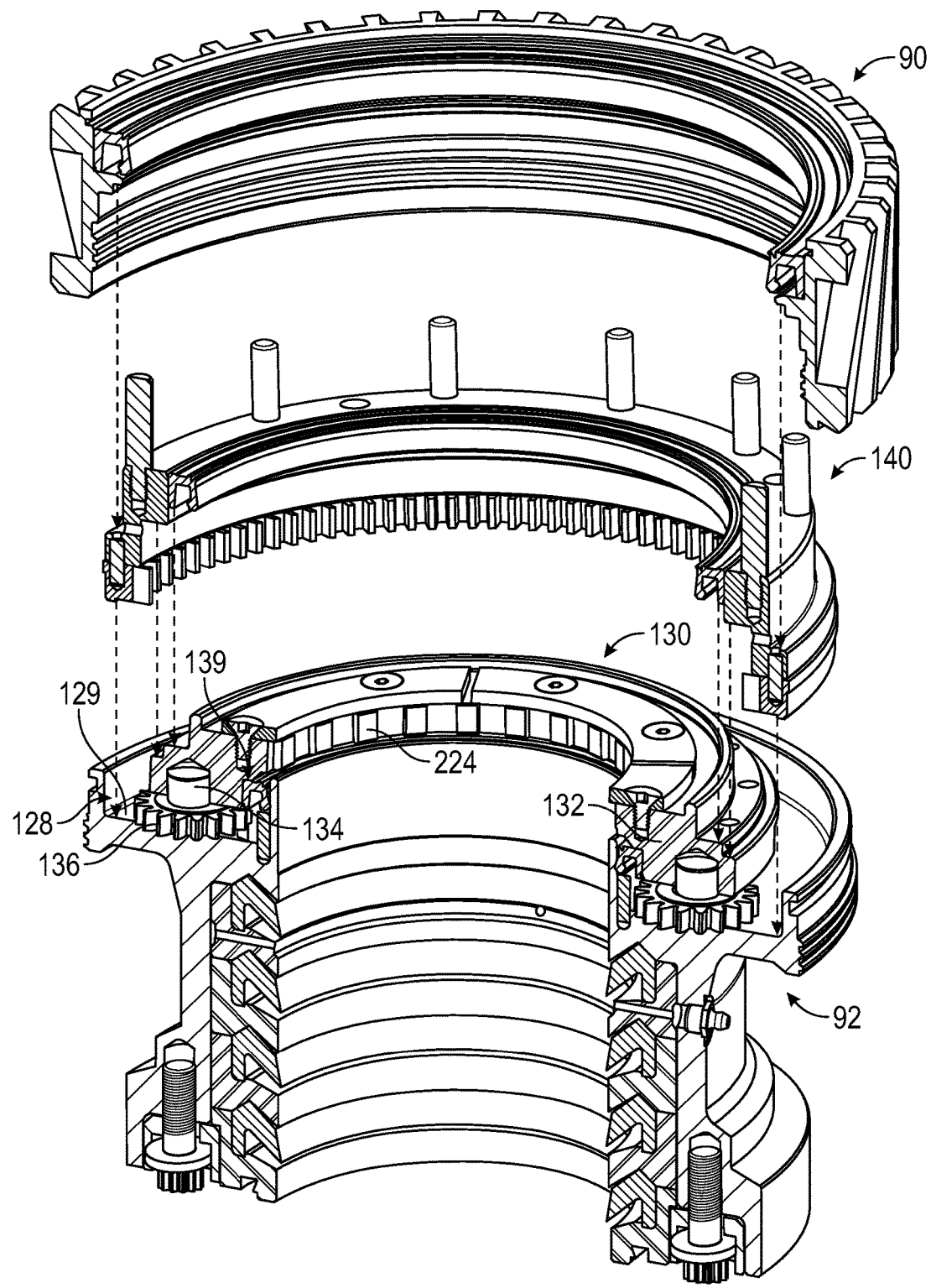
FIG. 5B is a schematic assembly view of the planet gear carrier assembly partially assembled with the lower assembly of FIG. 5A.
Figure 5C:
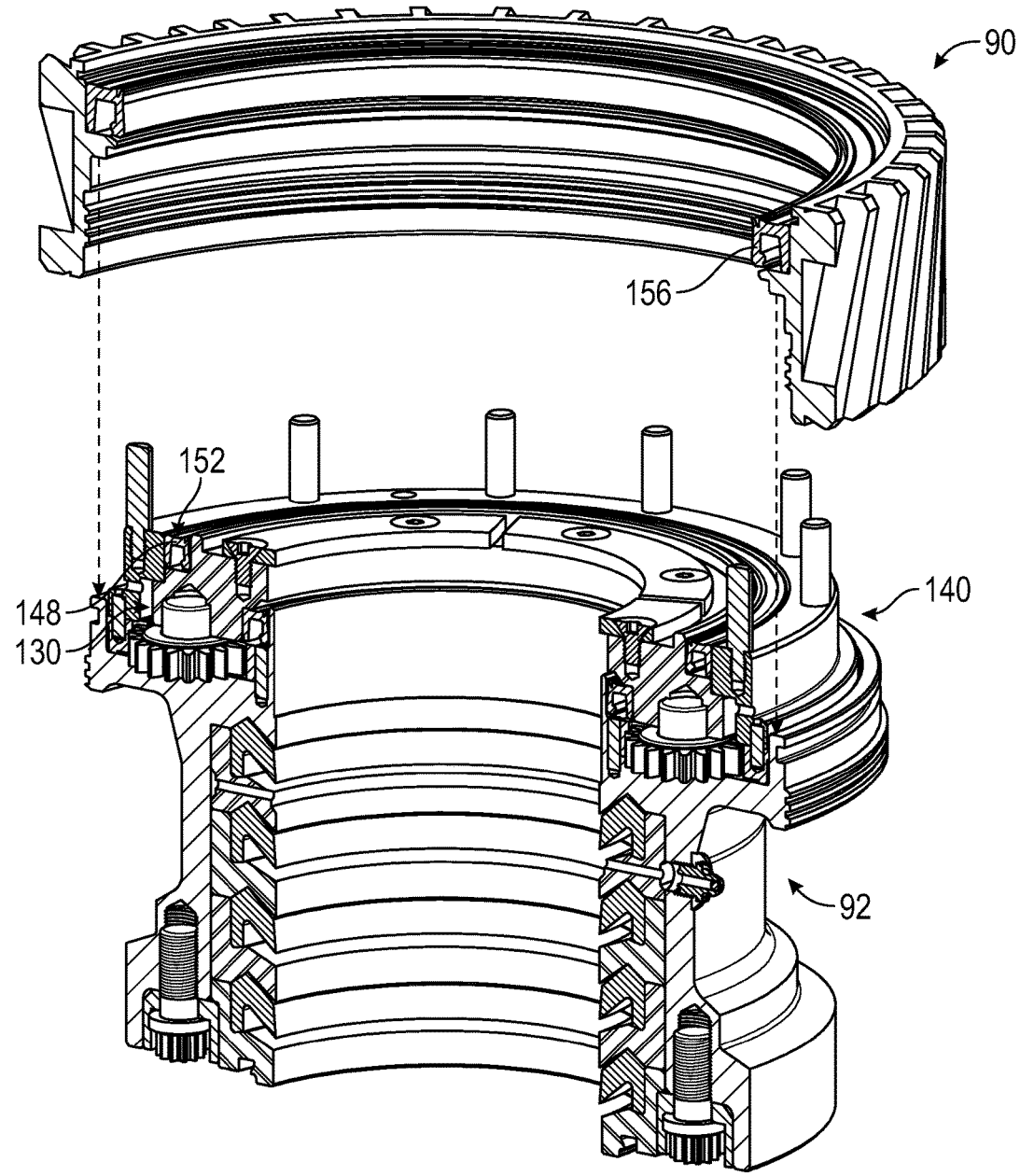
FIG. 5C is a schematic assembly view of the planet gear carrier assembly further assembled with the lower assembly of FIG. 5B.
Figure 5D:
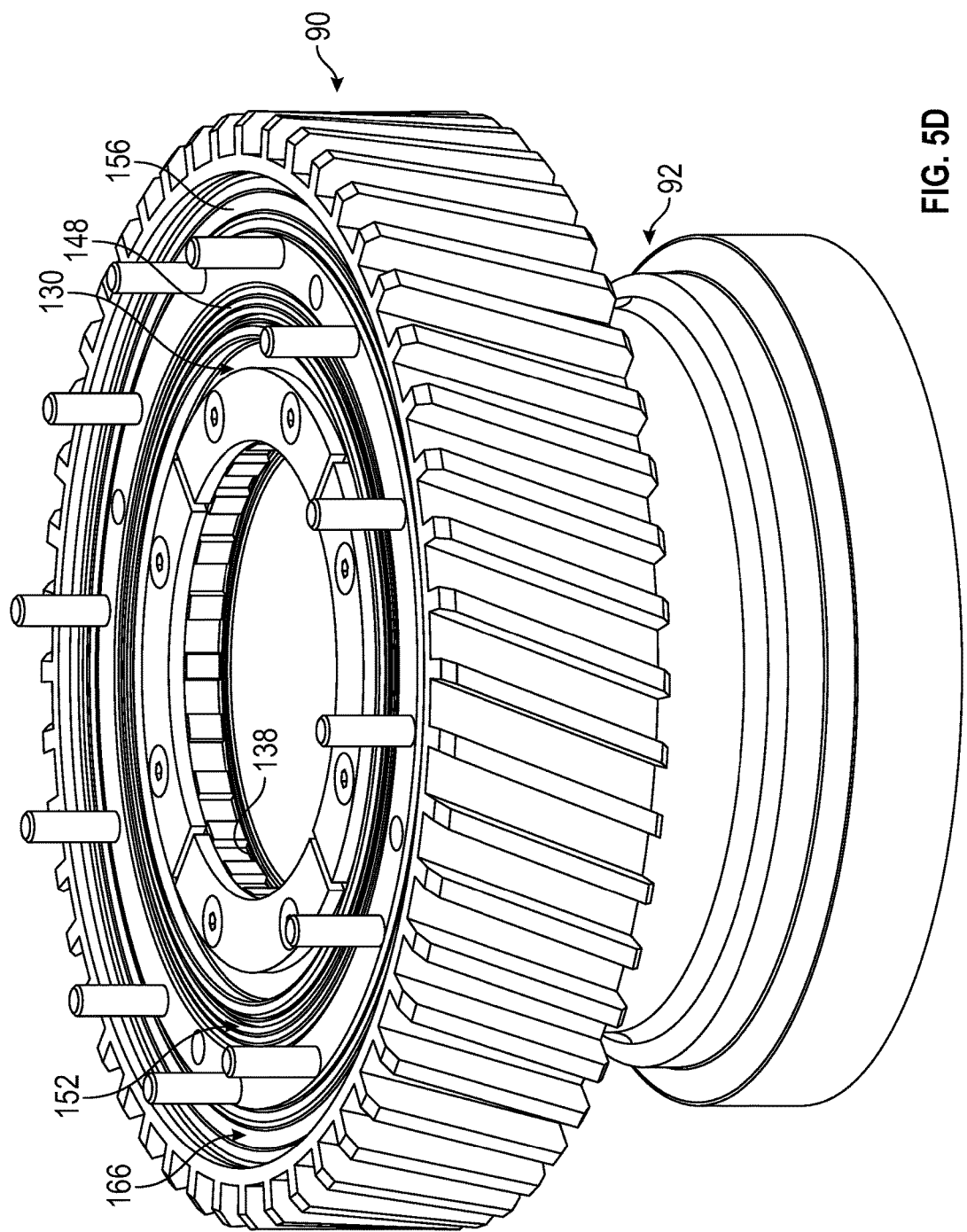
FIG. 5D is a schematic assembly view of the planet gear carrier assembly that is assembled with the lower assembly of FIG. 5C.

FIG. 5A is a schematic assembly view of an exemplary planet gear carrier assembly and lower assembly of the epicyclic washpipe swivel cartridge of FIG. 3. FIG. 5B is a schematic assembly view of the planet gear carrier assembly partially assembled with the lower assembly of FIG. 5A. FIG. 5C is a schematic assembly view of the planet gear carrier assembly further assembled with the lower assembly of FIG. 5B. FIG. 5D is a schematic assembly view of the planet gear carrier assembly that is assembled with the lower assembly of FIG. 5C. The components have been described above in her shown in a partially disassembled state to illustrate aspects of the various components. The lower assembly 92 can include a plurality of lower packing spacers and lower packing seals. The seals can sealingly engage the washpipe 102, shown in FIG. 3. The channel 128 with a bottom pointing upward as an upper face 129 and with sidewalls 172 and 174 can be used to locate the components of the planet gear carrier assembly 130, ring gear assembly 140, and retainer ring assembly 90. The sun gear 126 can be disposed radially inward toward an inner side wall 172 of the channel, so that the sun gear teeth are disposed radially outward. In at least one embodiment, a plurality of planet gears 136 can be disposed in the channel 128 and rotate around their respective axles 134 that are coupled to the carrier ring 132 of the planet gear carrier assembly 130. The rotary seal 138 is sealingly engaged between the carrier ring 132 and the radially inward side wall 172 of the channel in the lower assembly 92, generally above the sun gear 126, to seal the interface 139. The ring gear assembly 140 with the ring gear 142 coupled to the holding ring 146 is located at least partially radially outwardly from the planet gears 136 in the channel 128, that is, toward a radially outer side wall 174 of the channel 128. The rotary seal 148 is sealingly engaged between the ring gear assembly 140 and the planet gear assembly 130 to seal the interface 152. The retainer ring assembly 90 with the rotary seal 156 can be coupled to the lower assembly 92 at least partially radially outward from the ring gear assembly 140 and seal the interface 166 between the retainer ring assembly and the ring gear assembly.

Figure 6:
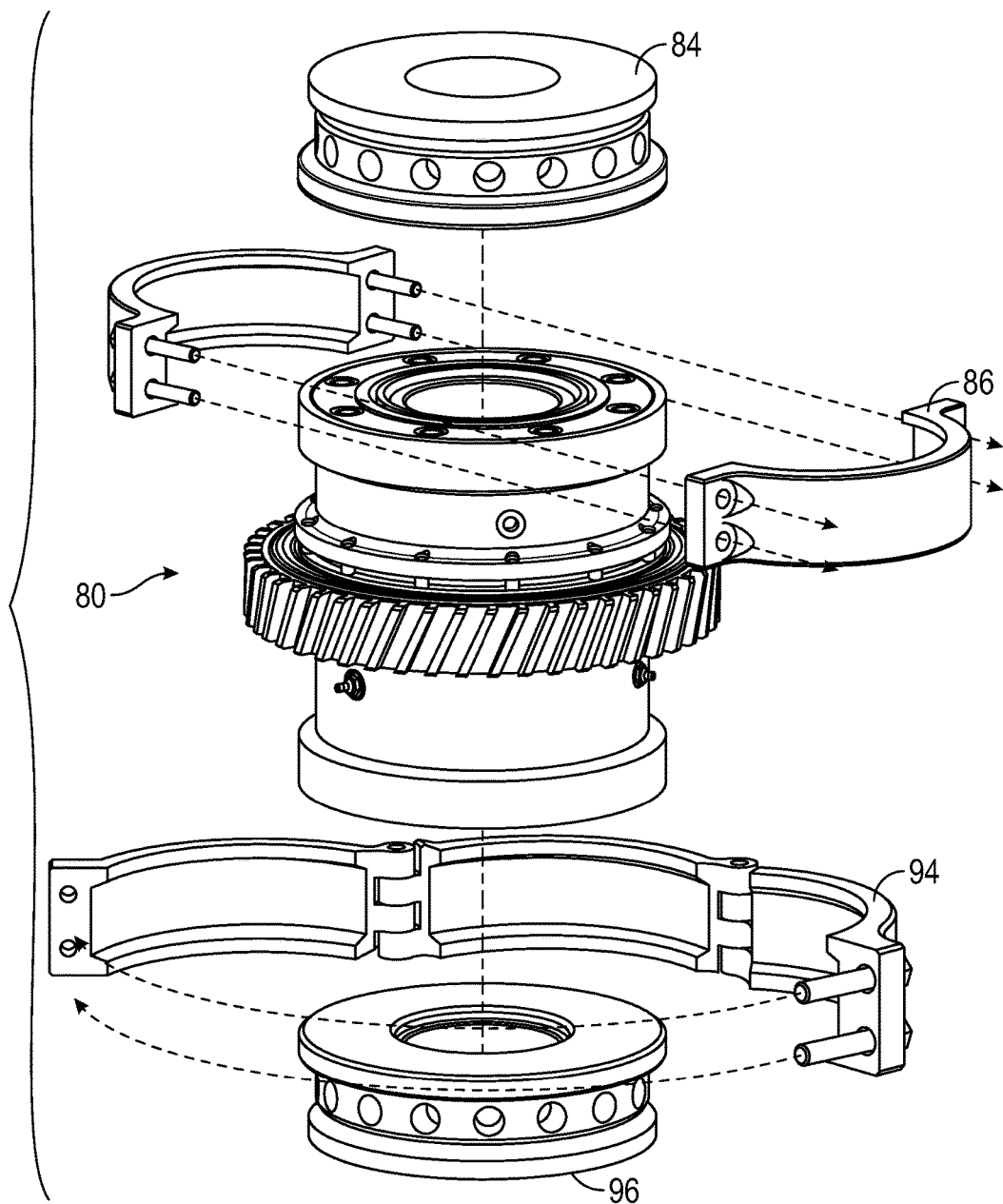
FIG. 6 is a schematic perspective view of the epicyclic washpipe swivel cartridge uncoupled for maintenance.

FIG. 6 is a schematic perspective view of the epicyclic washpipe swivel cartridge uncoupled for maintenance. Maintenance with the swivel cartridge 80 is relatively simple. To remove the swivel 80 from the top drive assembly, the upper clamp 86 and the lower clamp 94 (shown in FIG. 2) can be loosened and removed to expose the upper adapter hub 84 and the lower adapter hub 96 with the swivel cartridge 80 slidably engaged therebetween. Sufficient clearance can be made for the swivel cartridge 80 and the cartridge can be slid from between the surfaces of the two adapter hubs. The swivel cartridge 80 can be replaced in its entirety or can be disassembled and repaired, such as shown in FIG. 7.

FIG. 7 is a schematic perspective view of portions of the epicyclic washpipe swivel cartridge disassembled for maintenance. If repair of the swivel cartridge is desired, the swivel cartridge can be disassembled by sliding the upper packing assembly off of the upper surfaces of the washpipe 102. The washpipe retainer plate 128 can be removed from around the outer periphery of the washpipe 102. The lower assembly 92 and gearing attached thereto, including the planet gear carrier assembly 130, ring gear assembly 140 and the retainer ring assembly 90, can be removed from a lower portion of the washpipe 102. The various components can be disassembled from the upper and lower assemblies and gearing components for repair or replacement. The swivel cartridge 80 can be reassembled and reinstalled between the adapter hubs 84 and 96 and the corresponding clamps 86 and 94 be tightened in position between the respective adapter hubs and portions of the swivel cartridge to resume operations.

Figure 8B:
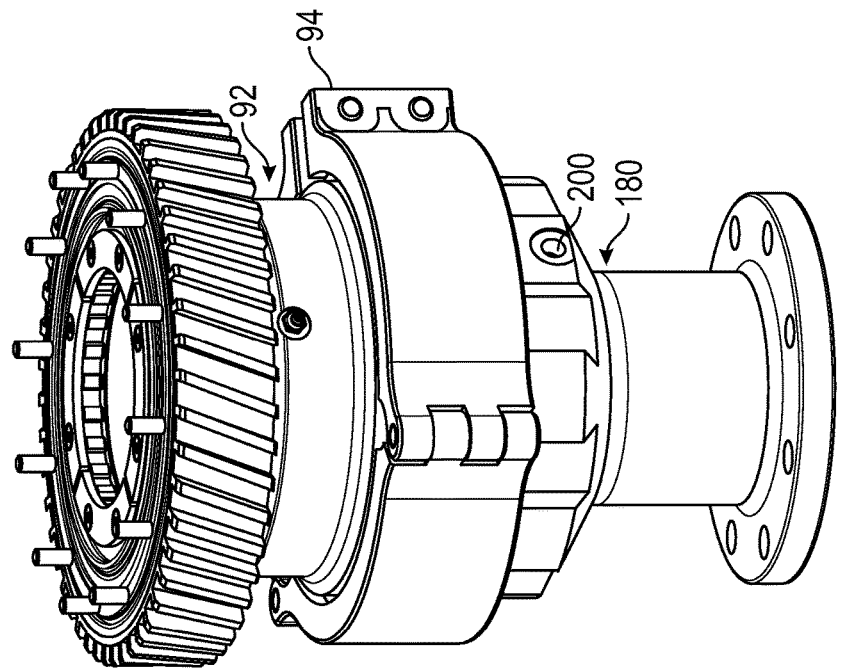
FIG. 8B is a schematic perspective view of the seal compressor coupled with the swivel cartridge.
Figure 8A:
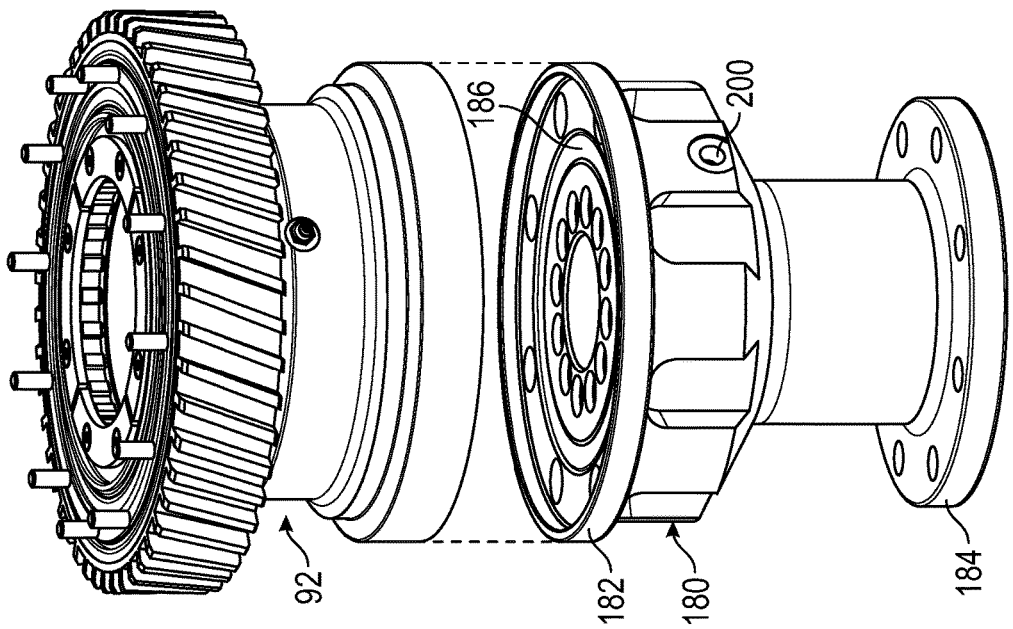
FIG. 8A is a schematic perspective view of an exemplary embodiment of a seal compressor used to set seals in the swivel cartridge of FIG. 2.
Figure 8F:
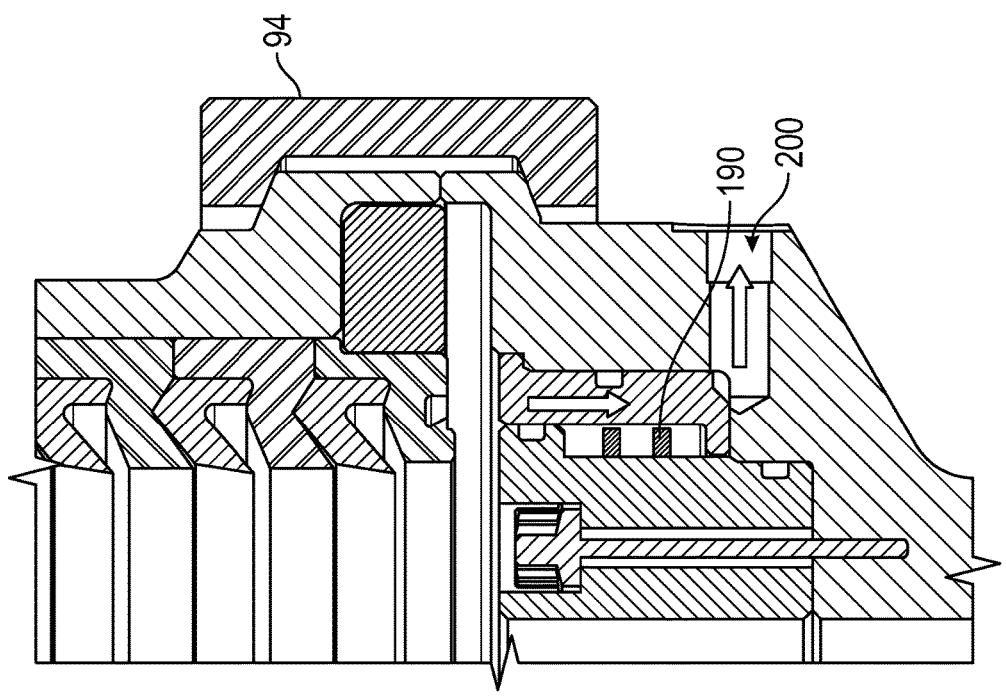
FIG. 8F is a schematic cross sectional view of the seal compressor deactivated from compression on the seal and spacer in the swivel cartridge of FIG. 8E.
Figure 8E:
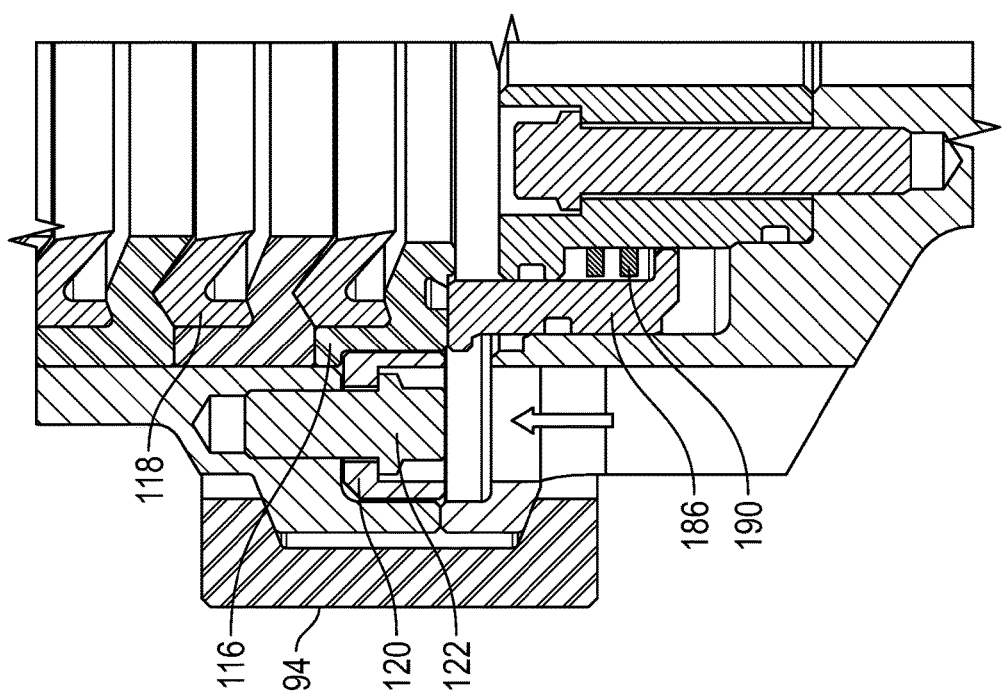
FIG. 8E is a schematic cross sectional view of the seal compressor coupled with the swivel cartridge of FIG. 8D showing a fastener and retainer ring tightened to retain the seal and spacer in longitudinal position.

FIG. 8A is a schematic perspective view of an exemplary embodiment of a seal compressor used to set seals in the swivel cartridge of FIG. 2. FIG. 8B is a schematic perspective view of the seal compressor coupled with the swivel cartridge. FIG. 8C is a schematic cross sectional view of the seal compressor coupled with the swivel cartridge of FIG. 8B showing a gap between a seal and a spacer. FIG. 8D is a schematic cross sectional view of the seal compressor coupled with the swivel cartridge of FIG. 8C showing the seal compressor activated to close the gap between the seal and spacer. FIG. 8E is a schematic cross sectional view of the seal compressor coupled with the swivel cartridge of FIG. 8D showing a fastener and retainer ring tightened to retain the seal and spacer in longitudinal position. FIG. 8F is a schematic cross sectional view of the seal compressor deactivated from compression on the seal and spacer in the swivel cartridge of FIG. 8E.

The packing spacers 116 and packing seals 118 that form a packing stack 198, such as shown in FIG. 8C, have been described above for the upper and lower assemblies and generally should be in close contact to each other and preferably compressed together to sealingly engage the washpipe 102, described above. The upper packing retainer ring 110 and the lower packing retainer ring 120, described in reference to FIG. 3, can hold the respective packing stacks of packing spacers and packing seals in position once compressed. However, it may be advantageous to precompress the spacers and seals together prior to installation of the swivel cartridge on the top drive for easier and safer working conditions. The disclosure provides a seal compressor tool 180 to pre-compress the packing stack(s) in the swivel cartridge. For illustrative purposes, FIGS. 8A-8F show the seal compressor tool 180 pre-compressing the packing stack in the lower assembly 92. It is understood that a similar process can be performed on the upper assembly 88.

The seal compressor tool 180 generally includes a compression assembly housing 182 with a mounting portion 184. The compression assembly housing 182 can include an annular piston chamber 202 with a piston 186 disposed therein. The annular piston is radially sized to engage the annular dimensions of the packing stack 198, such as on the adjacent packing spacer 116, in the lower assembly 92 without radially engaging the packing retainer ring 120, described above. Various openings are formed in the compression assembly housing to allow access for tightening of fasteners 122 for the packing retainer ring 120 while the packing stack of spacers and seals is compressed. As shown in FIGS. 8C and 8D, the seal compressor tool 180 further includes a bias member 190, such as a spring, that biases a piston downward into the compression assembly housing 182. A retainer 192 can retain the springs 190 within the compression assembly housing 182 to maintain the bias on the piston 186. The retainer 192 can be secured in position in the compression assembly housing with fasteners 196. A fluid port 200 allows fluid into the piston chamber 202 with the piston 186 to activate the piston. A gap 188 between packing spacers 116A and 116B and a packing seal 118 disposed therebetween is illustrated in FIG. 8C.

The lower assembly 92 and the seal compression tool 180 can be coupled together by a clamp, such as the lower clamp 94 also described above, to restrain the components together during the operation of the seal compressor tool. After the seal compressor tool 180 is releasably coupled through the clamp 94 to the lower assembly 92, the piston 186 can be activated by pressurized fluid flowing inward through the fluid port 200 to move the piston upward against the packing stack 198. The piston can compress the stack, so that the gap 188 can be closed and the stack compressed, as shown in FIG. 8D. While in that position, the fasteners 122 can be tightened against the lower packing retainer ring 120 and into the lower assembly 92 to secure the packing stack in the compressed position, as shown in FIGS. 8D and 8E.

Once the fasters have secured the retainer ring in position against the packing stack, the pressure in the port 200 can be released. With the pressure released, the bias member 190 can cause the piston to retract back into the compression assembly housing 182 and exhaust fluid out of the piston chamber 202 through the fluid port 200.

Other and further embodiments utilizing one or more aspects of the inventions described above can be devised without departing from the disclosed invention as defined in the claims. For example, various shapes and quantities of fasteners, pistons, seals, and spacers can be used, and other variations can occur in keeping within the scope of the claims, and other variations.

The invention has been described in the context of preferred and other embodiments, and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicant, but rather, in conformity with the patent laws, Applicant intends to protect fully all such modifications and improvements that come within the scope or range of equivalents of the following claims.

What is claimed is:

1. An epicylic washpipe swivel cartridge for a washpipe, comprising:
   a lower assembly having a bore and a circumferential channel around an inside perimeter of the bore, the channel having an upper face open in an upward direction, and a sun gear coupled to a radially inward periphery of the channel, the sun gear configured to radially engage outwardly;
   a planet gear carrier assembly having a carrier ring, a downwardly disposed axle, a planet gear rotatably coupled to the axle and supported by the upper face of the channel, the planet gear disposed radially outward from the sun gear and configured to engage the sun gear, and a rotary seal disposed between the carrier ring and the lower assembly that is configured to seal a leakage path through an interface between the lower assembly and the carrier ring from the washpipe radially outward;
a ring gear assembly having a ring gear disposed radially outward from the planet gear, the ring gear configured to rotatably engage the planet gear distally from the sun gear, a holding ring coupled to the ring gear, and a rotary seal disposed between the holding ring and the carrier ring that is configured to seal a leakage path from an upward direction into an interface between the holding ring and the carrier ring; and
a retainer ring assembly configured to radially engage an outward surface of the lower assembly adjacent the ring gear assembly, the retainer ring assembly having a retainer ring and a rotary seal disposed radially inward from the retainer ring that is configured to seal a leakage path from an upward direction into an interface between the retainer ring and the holding ring.

2. The swivel cartridge of claim 1, further comprising a sealed lubrication chamber wherein the gears are disposed at least partially within the chamber.

3. The swivel cartridge of claim 2, wherein the sealed lubrication chamber contains liquid, viscous, solid, or combinations thereof of lubricant disposed between metal-to-metal surfaces.

4. The swivel cartridge of claim 1, further comprising a lower adapter hub coupled to the lower assembly.

5. The swivel cartridge of claim 4, further comprising a lower clamp configured to clamp the lower adapter hub into sealing engagement with the lower assembly.

6. The swivel cartridge of claim 4, wherein the lower adapter hub is configured to be coupled to a lower top drive connection.

7. The swivel cartridge of claim 1, wherein the lower assembly is rotatable about a longitudinal axis through the washpipe.

8. The swivel cartridge of claim 1, wherein the ring gear is non-rotatably coupled relative to the holding gear.

9. The swivel cartridge of claim 1, wherein the lower assembly further comprises at least one of a packing spacer and a packing seal disposed around the washpipe.

10. The swivel cartridge of claim 1, further comprising an upper assembly having a bore, and at least one of a packing spacer and a packing seal disposed around the bore.

11. The swivel cartridge of claim 10, wherein the upper assembly is non-rotatable relative to the washpipe.

12. The swivel cartridge of claim 10, further comprising an upper adapter hub coupled to the upper assembly.

13. The swivel cartridge of claim 12, wherein the upper adapter hub is configured to be coupled to an upper top drive connection.

14. The swivel cartridge of claim 10, wherein the ring gear is coupled to the holding gear and the holding gear is non-rotatably coupled to the upper assembly.

15. The swivel cartridge of claim 1, further comprising a seal compressor tool configured to compress a packing stack of packing spaces and packing seals in the lower assembly.

* * * * *